(12) United States Patent
Yao et al.

(10) Patent No.: US 10,205,203 B2
(45) Date of Patent: Feb. 12, 2019

(54) COOLING SYSTEM FOR BATTERY PACK (71) Applicant: CONTEMPORARY AMPEREX TECHNOLOGY CO., LIMITED, Ningde (CN)

(72) Inventors: Jihua Yao, Ningde (CN); Ping Pan, Ningde (CN); Yihua Pei, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 15/390,636

(22) Filed: Dec. 26, 2016

(65) Prior Publication Data
US 2017/0244142 A1 Aug. 24, 2017

(30) Foreign Application Priority Data

Feb. 24, 2016 (CN) .......................... 2016 1 0101243

(51) Int. Cl.
*H01M 10/6556* (2014.01)
*H01M 10/613* (2014.01)
(Continued)

(52) U.S. Cl.
CPC ..... *H01M 10/6556* (2015.04); *B60L 11/1874* (2013.01); *B60L 11/1877* (2013.01);
(Continued)

(58) Field of Classification Search
None
See application file for complete search history.

(56) References Cited

U.S. PATENT DOCUMENTS

| 6,094,927 A | 8/2000 | Anazawa |
| 2006/0216582 A1* | 9/2006 | Lee ..................... H01M 2/1077 |
| | | 429/120 |

(Continued)

FOREIGN PATENT DOCUMENTS

| CN | 201877543 U | 6/2011 |
| CN | 202127044 U | 1/2012 |

(Continued)

OTHER PUBLICATIONS

Chinese Office Action to corresponding Chinese Application No. 201610101243.3, dated Jul. 18, 2017.
European Search Report from corresponding European Application No. 17151217.1, dated Apr. 20, 2017.

*Primary Examiner* — Carmen V Lyles-Irving
(74) *Attorney, Agent, or Firm* — Tucker Ellis LLP (57) ABSTRACT

The present invention provides a cooling system for a battery pack, comprising: a housing, an air passage, a fan and at least two air holes; the housing comprises an upper cover and a box, the upper cover is connected with the box; the air passage is arranged on the box and comprises an airflow cavity, an air channel and an air hole; the airflow cavity is arranged at a bottom of the box; the air channel is arranged on a side wall of the box, and the bottom of the air channel is communicated with the airflow cavity; all the air holes are arranged on the housing and communicated with the air passage, wherein at least one air hole is arranged on the upper cover and corresponds to a top end of the air channel; and the fan is arranged inside the air passage.

6 Claims, 7 Drawing Sheets (51) Int. Cl.
  *H01M 10/625* (2014.01)
  *H01M 10/6563* (2014.01)
  *B60L 11/18* (2006.01)
  *H01M 10/6554* (2014.01)
  *H01M 2/10* (2006.01)
  *H01M 10/6551* (2014.01)
  *H01M 10/6566* (2014.01)

(52) U.S. Cl.
  CPC ....... *B60L 11/1879* (2013.01); *H01M 10/613* (2015.04); *H01M 10/625* (2015.04); *H01M 10/6554* (2015.04); *H01M 10/6563* (2015.04); *H01M 2/1072* (2013.01); *H01M 10/6551* (2015.04); *H01M 10/6566* (2015.04); *H01M 2220/20* (2013.01)

(56) References Cited

U.S. PATENT DOCUMENTS

| 2008/0280192 | A1* | 11/2008 | Drozdz | B60K 6/28 429/62 |
| 2009/0191451 | A1 | 7/2009 | Sato | |
| 2015/0200430 | A1 | 7/2015 | Allmann | |
| 2015/0325891 | A1* | 11/2015 | Inoue | H01M 10/613 180/68.1 |

FOREIGN PATENT DOCUMENTS

| CN | 203039001 U | 7/2013 |
| CN | 104183889 A | 12/2014 |
| JP | 2014075181 A | 4/2014 |

* cited by examiner

COOLING SYSTEM FOR BATTERY PACK

CROSS-REFERENCE TO RELATED APPLICATIONS

The present application claims priority to Chinese Patent Application No. 201610101243.3, filed on Feb. 24, 2016, the content of which is incorporated herein by reference in its entirety.

TECHNICAL FIELD

The present invention relates to the field of battery technologies and, in particular, relates to a cooling system for a battery pack.

BACKGROUND

At present, with the rapid development of the new energy industry, batteries are more extensively used than ever before, for example, in electric vehicles. Power battery system supplies electric energy to the electric vehicles, such that the electric vehicles can travel.

Generally, a battery may generate a certain amount of heat no matter whether the battery is in a charging state or in a discharging state. When the heat amount is huge, the temperature of the battery will exceed a normal temperature range, resulting in that the performance of the battery is degraded and the cycling service life of the battery is shortened. Hence, the power battery system needs to be cooled such that the battery works in an optimal state.

The cooling system for a battery pack in the relate art mostly cool the batteries by means of air cooling or water cooling. When air cooling is adopted for cooling the battery, the battery is typically cooled by means of natural air. Since the flowability of the natural air in the environment where the battery is located is poor, the cooling effect is not ideal.

SUMMARY

The present invention provides a cooling system for a battery pack to solve the problem that the cooling system for a battery pack in the related art has a poor cooling effect due to poor flowability of natural airflow in the environment where the battery pack is located.

The present invention provides a cooling system for a battery pack, including: a housing, an air passage, a fan and at least two air holes;

the housing includes an upper cover and a box, the upper cover is connected with the box;

the air passage is arranged on the box and includes an airflow cavity, an air channel and the at least two air holes;

the airflow cavity is arranged at a bottom of the box;

the air channel is arranged on a side wall of the box, and a bottom of the air channel is communicated with the airflow cavity;

all the air holes are arranged on the housing and communicated with the air passage, wherein at least one air hole is arranged on the upper cover and corresponds to a top end of the air channel;

the fan is arranged inside the air passage.

Further, in the above cooling system for a battery pack, two air channels are provided, and two air holes are provided;

the two air holes are both arranged on the upper cover, and respectively correspond to one of the air channels.

Further, the above cooling system for a battery pack further includes: an air-cooling plate;

the box includes side walls and a bottom plate;

the side walls enclose to form a barrel structure with two ends opened;

the air-cooling plate is connected with bottoms of the side walls;

the bottom plate is arranged inside the barrel structure and parallel to the air-cooling plate, and a gap is defined between the bottom plate and the air-cooling plate, such that the bottom plate, the side walls and the air-cooling plate together enclose to form the airflow cavity.

Further, in the above cooling system for a battery pack, a plurality of air flow limiting channels are arranged in parallel inside the airflow cavity, an end of the air flow limiting channel is communicated with at least one of the air holes, and the other end of the air flow limiting channel is communicated with at least one of the air holes.

Further, in the above cooling system for a battery pack, a separation plate extending perpendicularly to the air-cooling plate is arranged inside the airflow cavity, and the airflow cavity is separated by the separation plate into the plurality of air flow limiting channels.

Further, in the above cooling system for a battery pack, the air flow limiting channels have a same width.

Further, in the above cooling system for a battery pack, the two air channels are both disposed on a same side of the box.

Further, in the above cooling system for a battery pack, a sub-separation plate is arranged in the air flow limiting channel, the sub-separation plate extends along an extending direction of the air flow limiting channel and separates the air flow limiting channel into air flow limiting sub-channels in parallel.

Further, in the above cooling system for a battery pack, a plurality of heat dissipation ribs are spacedly arranged outside the side walls of the box.

Further, the above cooling system for a battery pack further includes: an air hole sealing ring;

the air hole is sealed with an edge of the air channel via the air hole sealing ring.

In the cooling system for a battery pack according to the present invention, an air passage is arranged on a box, and the air passage includes an airflow cavity, an air channel and an air hole, wherein the airflow cavity is arranged at the bottom of the box; the air channel is arranged on a side wall of the box and is communicated with the airflow cavity via the air hole, such that the air enters the battery pack and flows along a specific direction. In addition, a fan is added to promote flowability of the air. Such solution solves the problem that, in the related art, the cooling effect is not ideal in the cooling system for a battery pack due to poor flowability of the natural air in the environment where the battery pack is located, accelerates dissipation of the heat in the battery pack, such that the components in the battery pack are capable of working in a stable temperature range, and the service life of the battery pack is prolonged.

BRIEF DESCRIPTION OF DRAWINGS

In order to describe embodiments of the present invention or the technical solution in the prior art, accompanying drawings that are to be referred for description of the embodiments or the prior art will be briefly described hereinafter. Apparently, the drawings described hereinafter merely illustrate some embodiments of the present invention. Persons of ordinary skill in the art may also derive other drawings based on the drawings described herein without any creative effort.

REFERENCE SIGNS

1—Upper cover
11—Air hole
2—Box
21—Air passage
211—Airflow cavity
2111—Air flow limiting channel
2112—Separation plate
2113—Sub-separation plate
212—Air channel
22—Heat dissipation rib
23—Bottom plate
3—Fan
4—Air-cooling plate

DESCRIPTION OF EMBODIMENTS

In order to make the objectives, technical solutions and advantages of the embodiments of the present invention clearer, the technical solutions according to the embodiments of the present invention are clearly and completely described with reference to the accompanying drawings of the embodiments of the present invention. The described embodiments are merely exemplary, rather than all the embodiments of the present invention. Based on the embodiments of the present invention, all other embodiments derived by persons of ordinary skill in the art without any creative efforts shall fall within the protection scope of the present invention.

Figure 1:
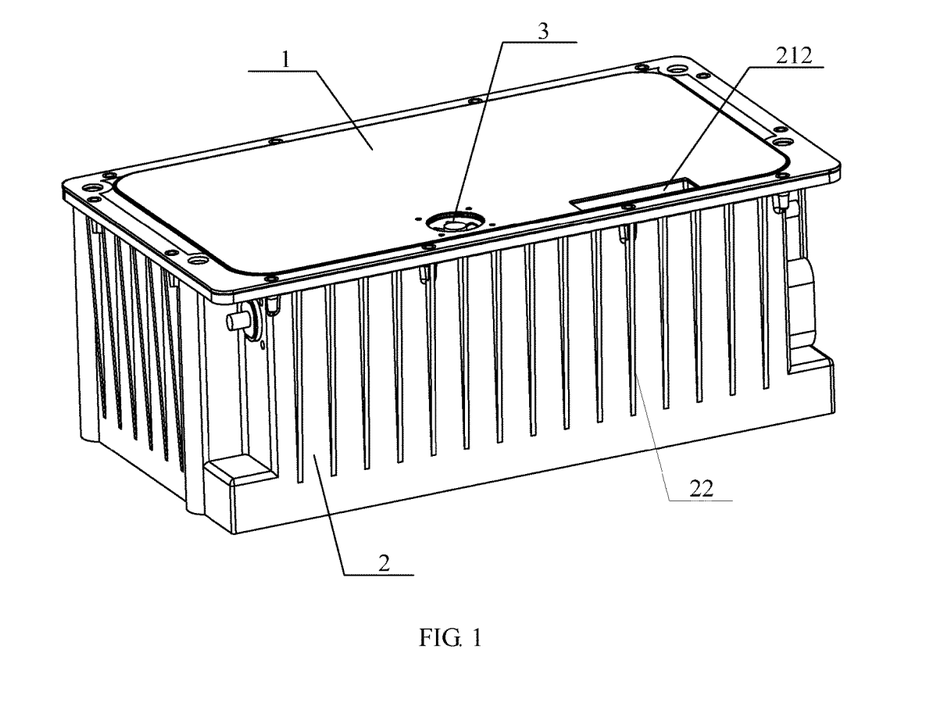
FIG. 1 is a schematic integral structural diagram of a cooling system for a battery pack according to an embodiment of the present invention.
Figure 2:
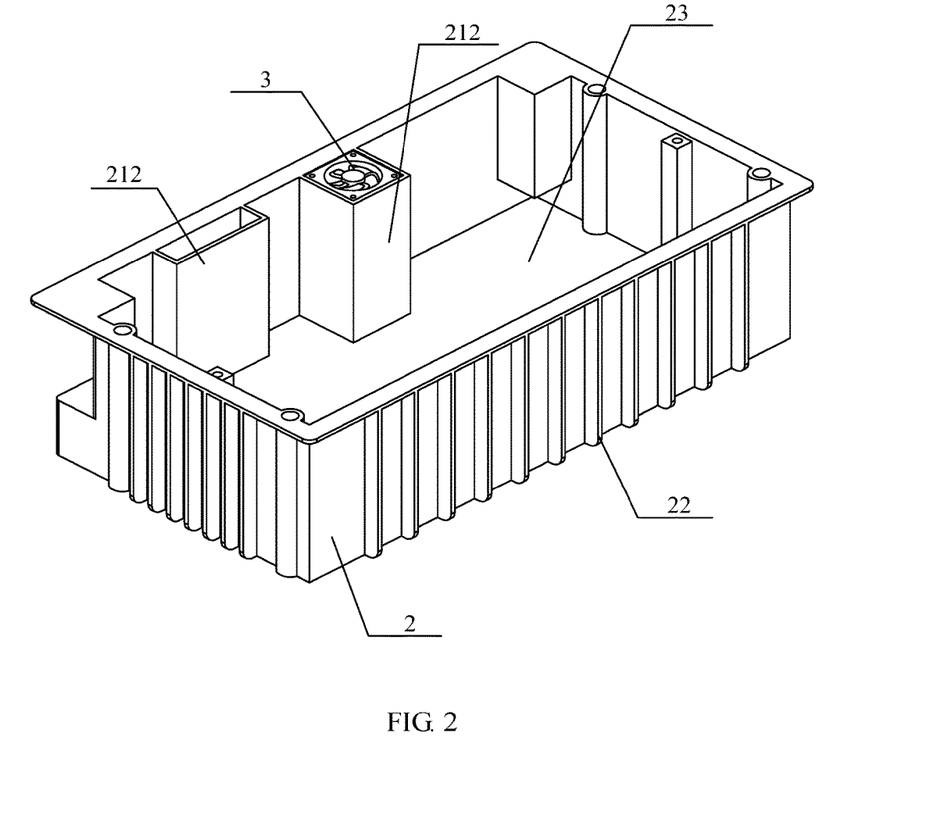
FIG. 2 is a schematic partial structural diagram of the cooling system for a battery pack according to an embodiment of the present invention.

FIG. 1 is a schematic integral structural diagram of a cooling system for a battery pack according to an embodiment of the present invention, and FIG. 2 is a schematic partial structural diagram of the cooling system for a battery pack according to an embodiment of the present invention. As shown in FIG. 1 and FIG. 2, the cooling system for a battery pack according to the present embodiment includes a housing and an air passage 21.

The cooling system for a battery pack according to the present embodiment may be applied to an environment such as an electric vehicle where flowability of airflow is poor. The housing includes an upper cover 1 and a box 2; the air passage 21 is arranged on the box 2 and includes an airflow cavity 211, an air channel 212 and at least two air holes 11; all the air holes 11 are arranged on the housing; components in the box 2 such as battery, circuit board or the like are cooled by the air passing through the air passage 21. The airflow cavity 211 is arranged at the bottom of the box 2 so as to achieve a good heat dissipation effect to the bottom surface of the battery. In order to ensure that the air in the air passage 21 can take maximum heat away, such that the heat can be fully used, preferably, the air channel 212 is arranged on a side wall of the box 2, and the bottom end of the air channel 212 is communicated with the airflow cavity 211.

Since the box 2 is generally of a cuboid structure, the air channel 212 can be arranged on the same side wall of the box 2, or on different side walls of the box 2, which is defined according to actual needs. After the components in the box 2 are mounted, the upper cover 1 is connected with the box 2 to prevent dust or other impurities from entering into the box 2 and thus causing damages to the components in the box 2. In order to achieve that air is capable of both entering into the battery pack and exiting from the battery pack, at least two air holes 11 are provided, wherein the air holes 11 are both communicated with the air passage 21, and at least one of the air holes 11 is arranged on the upper cover 1 and corresponds to the top end of the air channel 212, such that the air enters into the battery pack from the upper cover 1 or exits from the battery pack from the upper cover 1. The other air holes 11 are arranged on the housing, such that the air enters into the battery pack from the upper cover 1 or exits from the battery pack from the upper cover 1. The air can be cycled within the box 2 of the battery. To be specific, the air enters into the battery pack from at least one of the air holes 11, flows in the airflow cavity 211 to take away the heat, and exits from the battery pack to the ambient environment from at least one of the other air holes 11.

Figure 3:
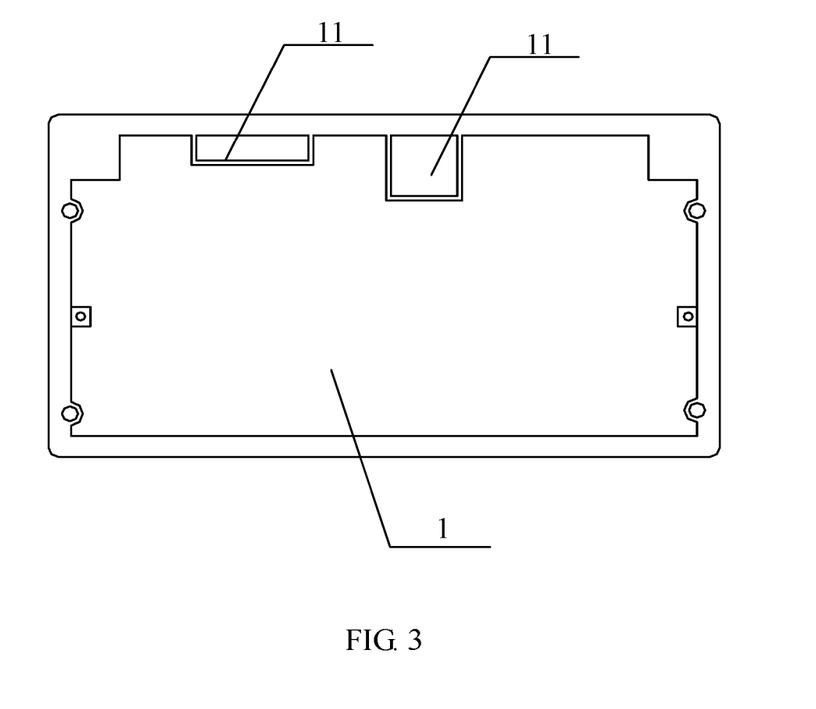
FIG. 3 is a schematic structural diagram of an upper cover of the cooling system for a battery pack according to an embodiment of the present invention.

FIG. 3 is a schematic structural diagram of an upper cover of the cooling system for a battery pack according to an embodiment of the present invention. As shown in FIG. 3, two air channels 212 are provided, and two air holes 11 are provided. The two air holes 11 are both arranged on the upper cover 1, and each corresponds to one of the air channels 212, such that the air may enter from one of the two air holes 11, and exit from the other one of the two air holes 11. FIG. 3 is merely schematic. During specific implementation, multiple combination manners may be employed, for example, preferably, one of the two air holes 11 may be arranged on the upper cover 1, and the other one of the two air holes 11 may be arranged at the bottom of the box 2; or, one of the two air holes 11 may be arranged on the upper cover 1, and the other one of the two air holes 11 may be arranged on a lower portion of the side wall of the box 2.

In order to achieve a better cooling effect, the cooling system for a battery pack according to the present embodiment is further provided with a fan 3. Through rotation of the fan 3, the convection coefficient is improved while the flowability of the air is accelerated, such that the air quickly takes away the heat generated in the battery pack, and thus the components in the battery pack are capable of working in a stable temperature range, and the service life of the components in the battery pack is prolonged.

Figure 7:
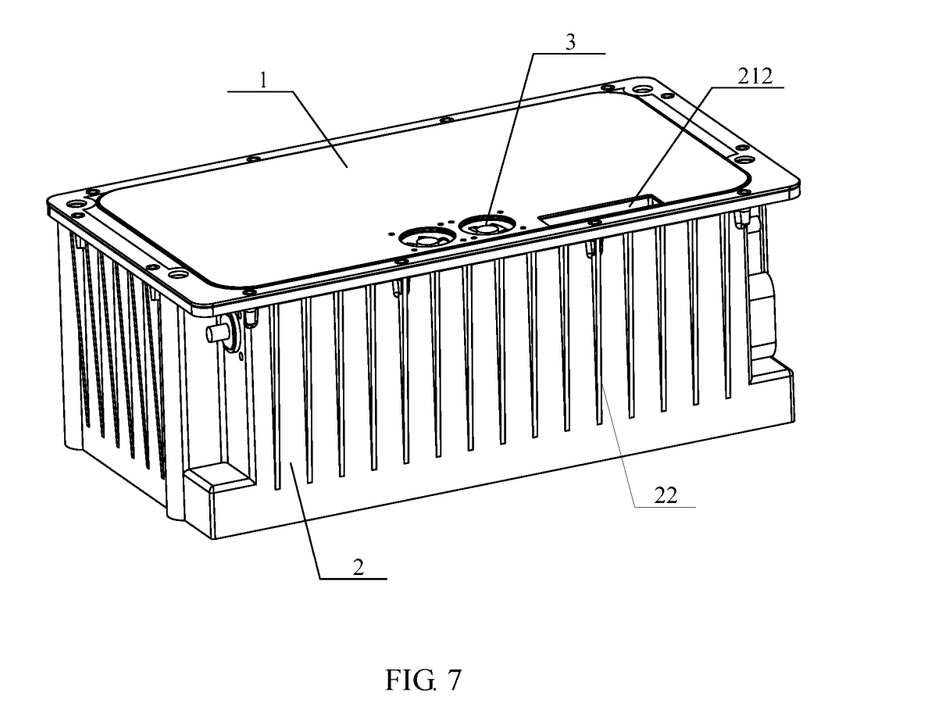
FIG. 7 is another schematic integral structural diagram of a cooling system for a battery pack according to an embodiment of the present invention.

In order to optimize the heat dissipation effect, the box 2 in the cooling system for a battery pack according to the present embodiment is preferably made from an aluminum alloy having a great thermal conductivity coefficient. The fan 3 may be an active silent fan 3, which may reduce the noise. FIG. 7 is another schematic integral structural diagram of a cooling system for a battery pack according to an embodiment of the present invention. As shown in FIG. 7, the number of fans 3 may be defined according to actual needs, wherein at least one fan 3 may be provided, and FIG. 7 uses two fans 3 as an example. The air channels 212 may be preferably integrated with the box 2, such that the working effects of the components in the battery pack will not be affected by the air entered into the box 2.

Figure 4:
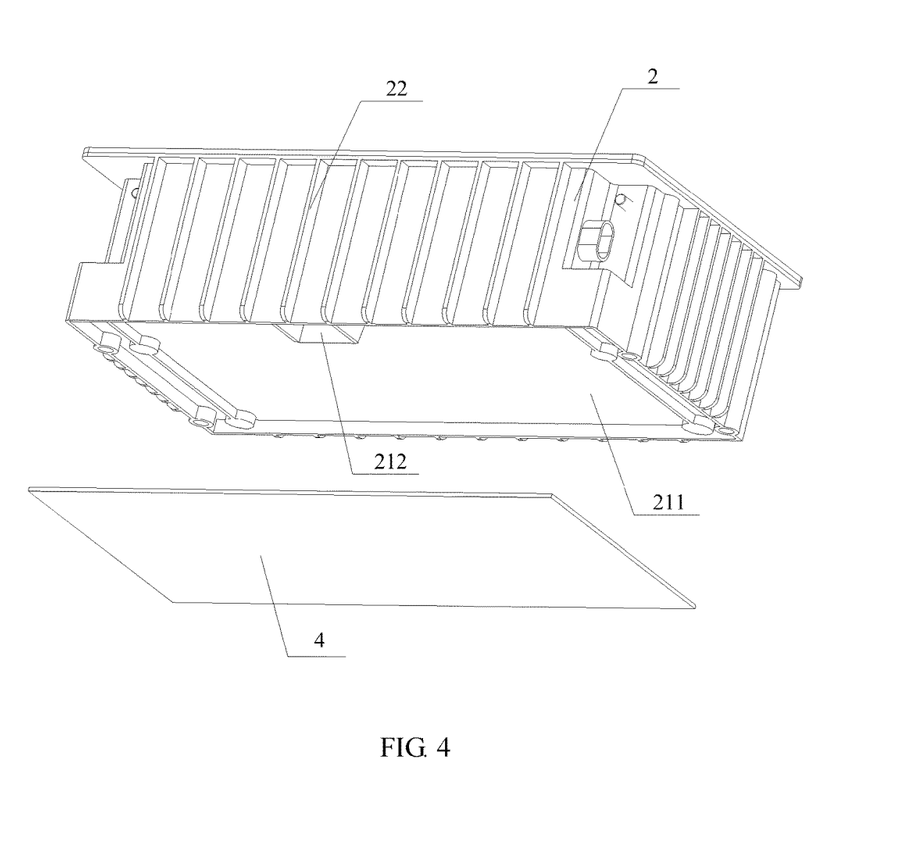
FIG. 4 is a schematic exploded structural diagram of the cooling system for a battery pack according to an embodiment of the present invention.

When the cooling system for a battery pack according to the present embodiment is applied to an electric vehicle, since the space for accommodating the battery pack in the electronic vehicle is limited, the airflow cavity 211 may be arranged in the box 2 to reduce the size of the battery and achieve a better heat dissipation effect. In this case, an air-cooling plate 4 needs to be used to cooperate with the box 2. FIG. 4 is a schematic exploded structural diagram of the cooling system for a battery pack according to an embodiment of the present invention. As shown in FIG. 4, the box 2 includes side walls and a bottom plate 23; the side walls enclose to form a barrel structure with two ends opened; and the air-cooling plate 4 is arranged at the bottom of the box 2, that is, the air-cooling plate 4 is connected to the bottom of the side walls, so as to form a closed structure of the box 2, and manner of nuts or the like may be used to fix the air-cooling plate 4 to the side walls of the box 2. In order to form the airflow cavity 211 in the box 2, the bottom plate 23 is arranged inside the barrel structure. Since the bottom of the battery is flat, the bottom plate 23 needs to be arranged parallel to the air-cooling plate 4, a gap is defined between the bottom plate 23 and the air-cooling plate 4, such that the bottom plate 23, the side walls and the air-cooling plate 4 together enclose to form the airflow cavity 211. The airflow cavity 211 is arranged in the interior of the box 2, which may achieve a good heat dissipation effect, improve integration rate, and reduce size of the battery pack.

The air-cooling plate 4 according to the present embodiment is preferably made from a steel plate or an aluminum alloy plate, and the air-cooling plate 4 is fixed to the box 2 by a welding process, which not only achieves the sealing effect, but also the water-proof and dust-proof (for example, the IP67 level) effects.

Figure 5:
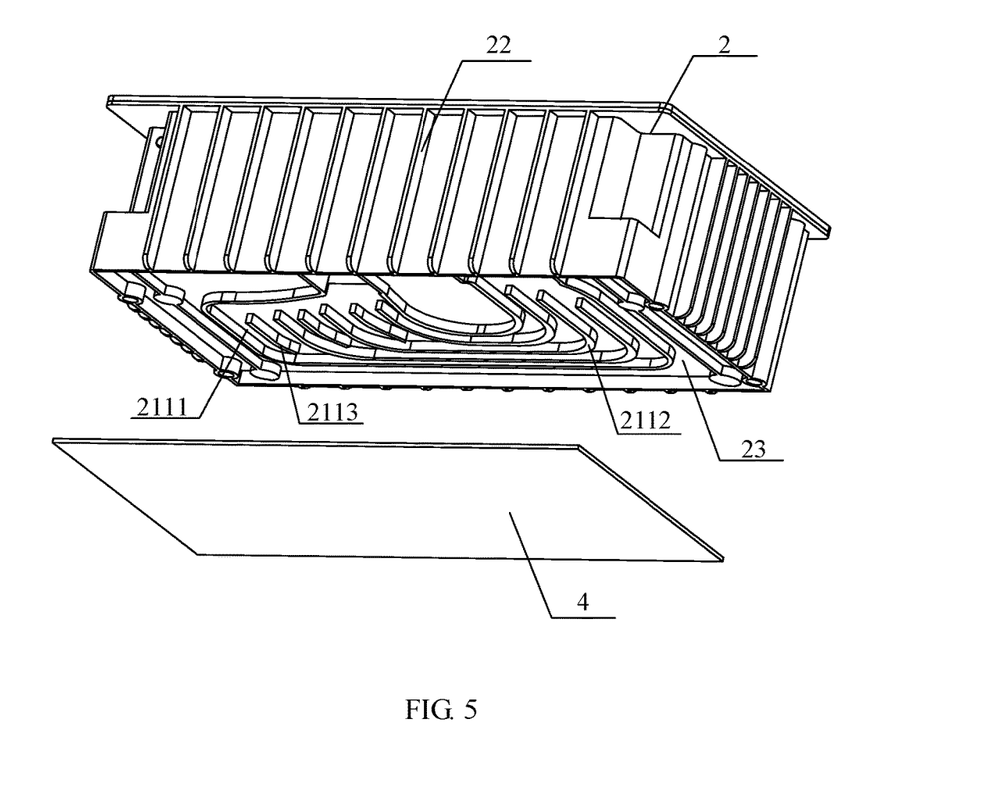
FIG. 5 is a schematic internal structural diagram of an airflow cavity of the cooling system for a battery pack according to an embodiment of the present invention.

In the above structure, the airflow cavity 211 is of a hollow structure, and the air non-sequentially enters into the airflow cavity 211, which only achieves a relatively low cooling efficiency for the battery. Therefore, a plurality of air flow limiting channels 2111 are arranged in the airflow cavity 211. FIG. 5 is a schematic internal structural diagram of an airflow cavity of the cooling system for a battery pack according to an embodiment of the present invention. As shown in FIG. 5, the plurality of air flow limiting channels 2111 are arranged in parallel. In order to achieve communication and enable the air to flow along a specific direction, an end of the air flow limiting channel needs to be communicated with one of the air holes 111, and the other end of the air flow limiting channel 2111 is communicated with another one of the air holes 11. The air flow limiting channels 2111 may be configured to a bending shape, for example, an S shape, a Z shape and the like. In order to ensure that the air quantity and the air speed in the plurality of air flow limiting channels 2111 are the same, a plurality of air passages are preferably configured to have the same width, which not only ensures that the air flows along a specific direction, but also achieves the same air speed in the air flow limiting channels 2111, thereby improving the cooling efficiency.

The plurality of air flow limiting channels 2111 are formed in the airflow cavity 211 by arranging a separation plate 2112, wherein the separation plate 2112 perpendicular to the air-cooling plate 4 separates the airflow cavity 211 into a plurality of air flow limiting channels 2111. The separation plate 2112 may be connected with the bottom plate 23, or may be connected with the air-cooling plate 4. The separation plate 2112 may be connected with the bottom plate 23 to form an integral structure, which only needs a simple process in practical production. Further, a groove may also be used to fix the separation plate 2112. The number of air flow limiting channels 2111 is defined specifically by increasing or decreasing the number of separation plates 2112, and thus the separation plates can be conveniently removed. The height of the separation plate 2112 is the same as the height of the gap between the bottom plate 23 and the air-cooling plate 4, which achieves a better effect on defining the direction of the air in the airflow cavity 211.

According to the fluid mechanics principle, a lower windage of the flowing air needs straight-line air flow limiting channels 2111. Due to restriction of the shape of the airflow cavity 211, the straight-line air flow limiting channels 211 have a short stroke, and thus the heat dissipation effect is undesirable. Therefore, the air flow limiting channels 2111 are configured as a U shape. The U-shaped air flow limiting channel has a straight-line portion, and also has a bending portion with a small bending angle, a uniform width and a less varied cross-section area, such that the windage of the air entering the airflow cavity 211 via the air channel 212 is small, and the airflow quantity is increased.

Figure 6:
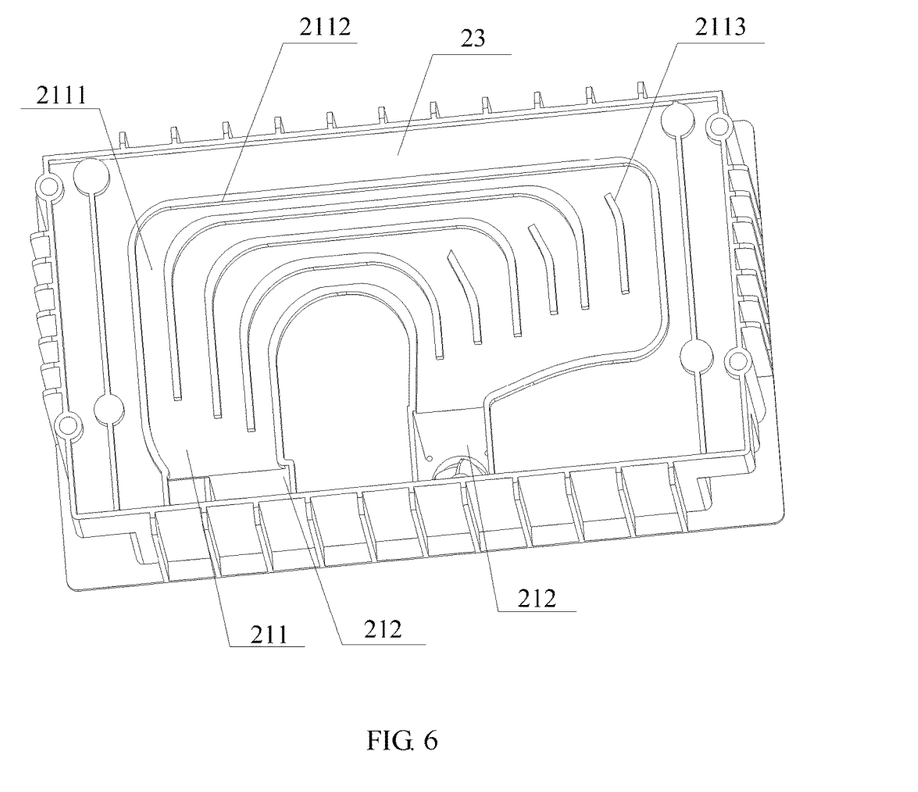
FIG. 6 is a schematic structural diagram of an air flow limiting channel of the cooling system for a battery pack according to an embodiment of the present invention.

Since the components in the battery pack are arranged according to a specific rule, and the position of the air channel 212 is also fixed, in order to enhance the local heat dissipation effect, the original air flow limiting channels 2111 may have different widths. In order to make the widths of the air flow limiting channels 2111 uniform, a sub-separation plate 2113 may be arranged in the air flow limiting channel 2111. FIG. 6 is a schematic structural diagram of an air flow limiting channel of the cooling system for a battery pack according to an embodiment of the present invention. As shown in FIG. 6, the sub-separation plate 2113 extends along an extending direction of the air flow limiting channels 2111, and separates the air flow limiting channel 2111 to air flow limiting sub-channels in parallel. In this way, the problem of non-uniform width of the air flow limiting channels 2111 is solved. In addition, the number of the air flow limiting channels 2111 or the air flow limiting sub-channels arranged where the local heat dissipation needs to be enhanced is more than those arranged at other areas. As such, the effect of uniform heat dissipation is achieved while the heat dissipation efficiency is improved.

In order to prevent the air from entering into the box 2, the air hole of the upper cover 1 is sealed with an edge of the air channels 212 via an air hole sealing ring (not shown in the drawings). Air may carry impurities such as dust and particles. With the sealing effect of the air hole sealing ring, it may be ensured, to some extent, that the components in the battery pack can work in a relatively dust-free environment, and thus the service life of the battery pack is prolonged to some extent. In addition, air may directly enter into the airflow cavity 211 via an air hole, and the air carrying a certain amount of heat exits from another air hole without air flow division, thereby improving the heat dissipation efficiency.

While the heat dissipation effect in the battery pack is improved, external heat dissipation of the battery pack is also enhanced. A plurality of heat dissipation ribs 22 are spacedly arranged outside the side walls of the box 2, wherein the box 2 and the ribs 22 form an integral structure, which are preferably made from an aluminum alloy having a good heat conductivity, thereby achieving the effect of increasing the heat dissipation area. The aluminum alloy, comparing to other materials, further reduces the weight while ensuring the strength.

Further, the battery pack where the cooling system for a battery pack according to the present embodiment is located may also include a component configured to detect the temperature of the battery, a battery management system and the like. By detecting the temperature of the battery at any time, whether the battery needs heat dissipation can be determined. When the temperature of the battery is higher than a normal temperature range, then the battery needs heat dissipation, the fan 3 is started to increase the air flow speed. When the temperature of the battery is within the normal temperature range, and the battery does not need heat dissipation, the fan 3 is stopped to save resources. In this way, the service life of the fan 3 may be prolonged.

The cooling system for a battery pack according to the present invention solves the problem that the cooling system for a battery pack in the related art has a poor cooling effect due to poor flowability of natural airflow in the environment where the battery pack is located, improves the air flow speed and enhances the heat dissipation effect. In addition, air flow limiting channels 2111 are arranged in the airflow cavity 211, such that the air flows along a specific direction, and thus the heat dissipation efficiency is improved. In this way, the components in the battery pack are capable of working in a suitable temperature range, and thus the service life of the battery pack is prolonged.

Finally, it should be noted that the above-described embodiments are merely for illustration of the present invention, but are not intended to limit the present invention. Although the present invention is described in detail with reference to these embodiments, person skilled in the art may also make various modifications to the technical solutions disclosed in the embodiments, or make equivalent replacements to a part of or all technical features contained therein. However, such modifications or replacements will not let essence of corresponding technical solutions depart from the scope of the technical solutions of corresponding embodiments of the present invention.

What is claimed is:

1. A cooling system for a battery pack, comprising: a housing, an air passage, a fan and at least two air holes;
   the housing comprises an upper cover and a box, the upper cover is connected with the box;
   the air passage is arranged on the box and comprises an airflow cavity, an air channel and the at least two air holes;
   the airflow cavity is arranged at a bottom of the box;
   the air channel is arranged on a side wall of the box, and a bottom of the air channel is communicated with the airflow cavity;
   all the air holes are arranged on the housing and communicated with the air passage, wherein at least one air hole is arranged on the upper cover and corresponds to a top end of the air channel;
   the fan is arranged inside the air passage,
   wherein the cooling system further comprises:
   an air-cooling plate;
   the box comprises side walls and a bottom plate;
   the side walls enclose to form a barrel structure with two ends opened;
   the air-cooling plate is connected with bottoms of the side walls;
   the bottom plate is arranged inside the barrel structure and parallel to the air-cooling plate, and a gap is defined between the bottom plate and the air-cooling plate, such that the bottom plate, the side walls and the air-cooling plate together enclose to form the airflow cavity,
   wherein, a plurality of air flow limiting channels are arranged in parallel inside the airflow cavity, an end of the air flow limiting channel is communicated with at least one of the air holes, and the other end of the air flow limiting channel is communicated with at least one of the air holes,
   wherein, a separation plate extending perpendicularly to the air-cooling plate is arranged inside the airflow cavity, and the airflow cavity is separated by the separation plate into the plurality of air flow limiting channels,
   wherein, a sub-separation plate is arranged in the air flow limiting channel, the sub-separation plate extends along an extending direction of the air flow limiting channel and separates the air flow limiting channel into air flow limiting sub-channels in parallel.

2. The cooling system for a battery pack according to claim 1, wherein, two air channels are provided, and two air holes are provided;
   the two air holes are both arranged on the upper cover, and respectively correspond to one of the air channels.

3. The cooling system for a battery pack according to claim 1, wherein, the air flow limiting channels have a same width.

4. The cooling system for a battery pack according to claim 2, wherein, the two air channels are both arranged on a same side of the box.

5. The cooling system for a battery pack according to claim 1, wherein, a plurality of heat dissipation ribs are spacedly arranged outside the side walls of the box.

6. The cooling system for a battery pack according to claim 1, further comprising: an air hole sealing ring;
   the air hole is sealed with an edge of the air channel via the air hole sealing ring.

* * * * *